(12) United States Patent
Schmidt (10) Patent No.: US 9,607,028 B2
(45) Date of Patent: Mar. 28, 2017

(54) OPERATION-BASED CONTENT PACKAGING

(71) Applicant: Verizon Patent and Licensing Inc., Basking Ridge, NJ (US)

(72) Inventor: Johannes P. Schmidt, Los Altos Hills, CA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 305 days.

(21) Appl. No.: 13/802,342

(22) Filed: Mar. 13, 2013

(65) Prior Publication Data

US 2014/0279848 A1 Sep. 18, 2014

(51) Int. Cl.
*G06F 17/30* (2006.01)
*H04N 21/2343* (2011.01)

(52) U.S. Cl.
CPC .......... *G06F 17/30324* (2013.01); *H04N 21/234309* (2013.01)

(58) Field of Classification Search
CPC ............................................. H04N 21/234309
See application file for complete search history.

(56) References Cited

U.S. PATENT DOCUMENTS

2011/0276712 A1* 11/2011 Narula et al. .................. 709/231
2012/0179833 A1* 7/2012 Kenrick et al. ............... 709/231
2013/0212342 A1* 8/2013 McCullough et al. ........ 711/156

OTHER PUBLICATIONS

Bitmap definition Mar. 18, 2016, Google, https://www.google.com/?gws_rd=ssl#q=bitmap+definition.*
Bytemap definition Mar. 18 2016, Google, https://www.google.com/?gws_rd=ssl#q=bytemap%20definition&nfpr=1&start=0.*
Bytemap Mar. 18, 2016, Google, https://www.google.com/?gws_rd=ssl#q=bytemap.*
mp4 bytemap Mar. 18, 2016, Google, https://www.google.com/webhp?hl=en#hl=en&q=mp4+bytemap.*

* cited by examiner

*Primary Examiner* — Jason Liao (57) ABSTRACT

In embodiments, apparatuses, methods and storage media are described that are associated with packaging of content. In embodiments, a bytemap file may be associated with an output packaging format for output content. The bytemap file may, in various embodiments, contain instructions that, when performed by a transpackager may generate output content based on one or more encoded content files. In order to generate output content starting at a specific requested offset, a bytemap index may contain mappings between offsets and instruction locations within the bytemap file. Thus, in response to a request for output content at an offset, an instruction location may be identified in the bytemap index, and instructions applied to the encoded content files starting at the identified location to generate the requested output content. Other embodiments may be disclosed and claimed.

26 Claims, 7 Drawing Sheets

OPERATION-BASED CONTENT PACKAGING

TECHNICAL FIELD

The present disclosure relates to the field of data processing, in particular, to apparatuses, methods and storage media associated with packaging of content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of content, and the manners in which the content is consumed. Today, myriad content may be made available from various sources of content, including but not limited to fixed medium (e.g., Digital Versatile Disk (DVD)), broadcast, cable operators, satellite channels, Internet, and so forth. Users may consume content with a television set, a laptop or desktop computer, a tablet, a smartphone, or other devices of the like. Users may also wish to consume video in a variety of packaging formats, which may need to be provided in response to consumption requests.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
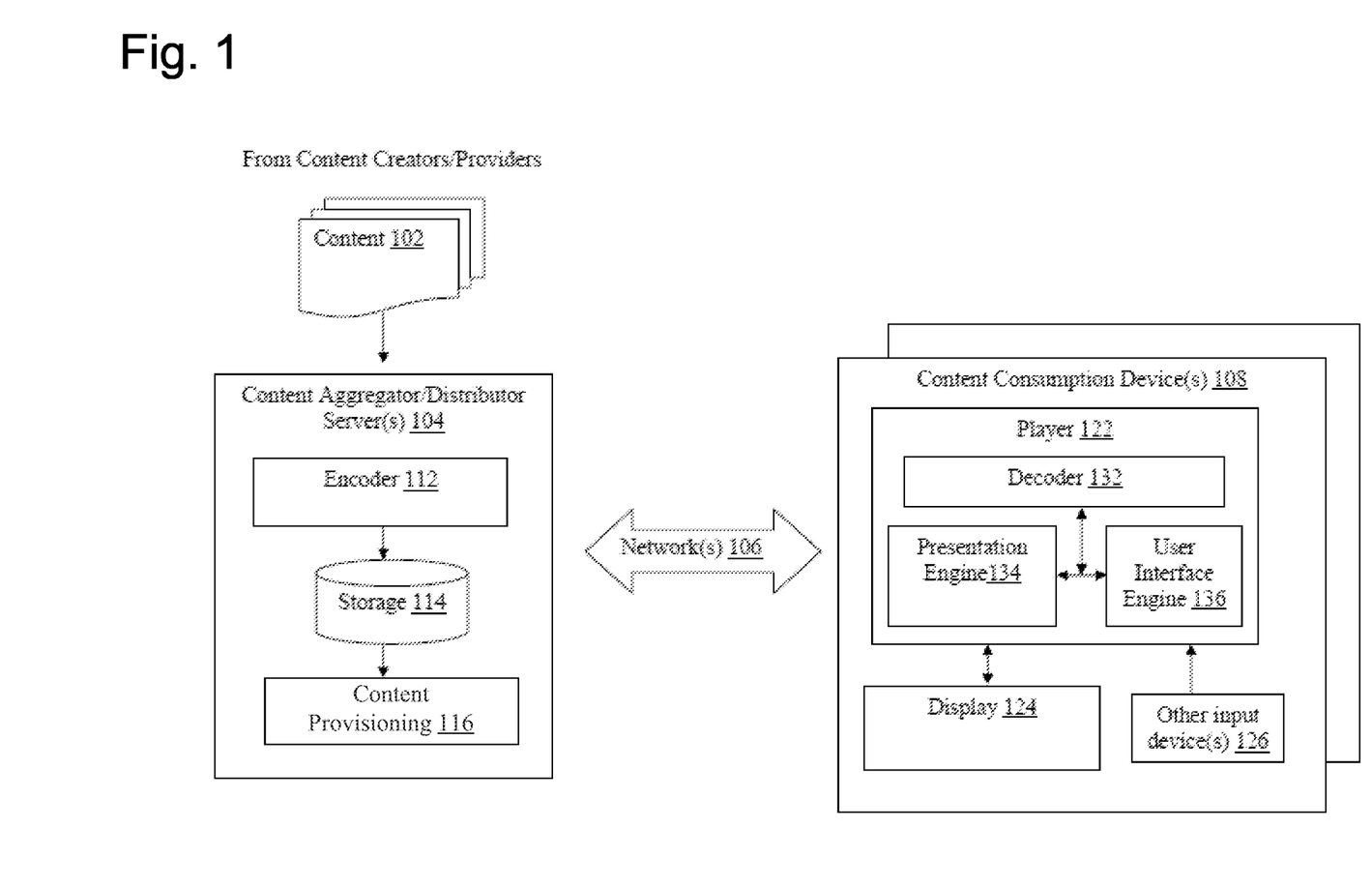
FIG. 1 illustrates an arrangement for content distribution and consumption, in accordance with various embodiments.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregator/distributor servers 104 via one or more networks 106. Content aggregator/distributor servers 104 may be configured to aggregate and distribute content to content consumption devices 108 for consumption, e.g., via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content providers, and storage 114 may be configured to store encoded content. Content provisioning 116 may be configured to selectively retrieve and provide encoded content to the various content consumption devices 108 in response to requests from the various content consumption devices 108. Content 102 may be media content of various types, having video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In various embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality levels. The different versions may provide different resolutions, different bitrates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but are not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Figure 2:
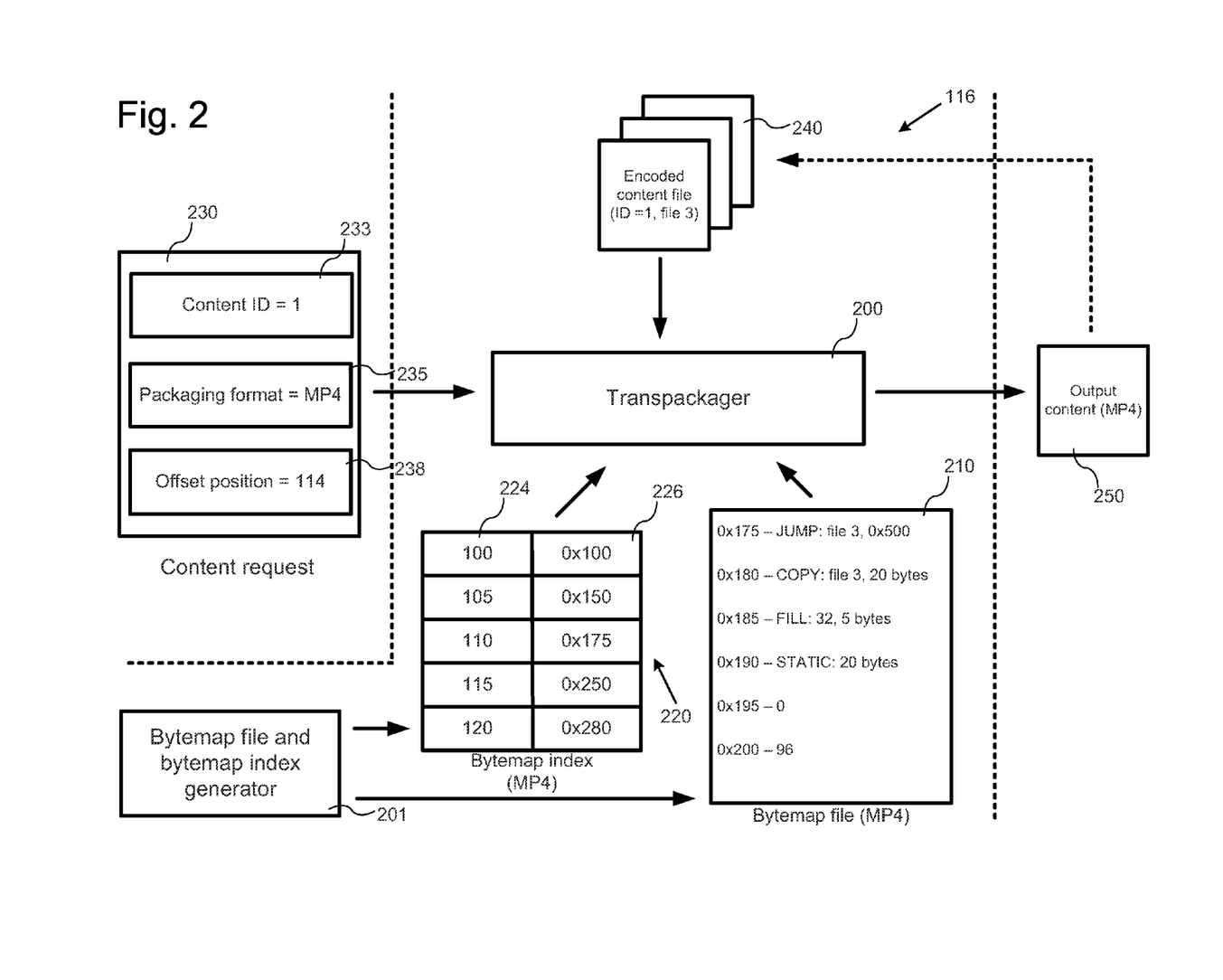
FIG. 2 illustrates example components and information flows for transpackaging of content, in accordance with various embodiments.

In various embodiments, content provisioning 116 may be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth. In various embodiments, content provisioning 116 may be configured to provide media files that are packaged according to one or more output packaging formats. In various embodiments, content provisioning 116 may include a transpackager, such as illustrated in FIG. 2 below, which may be configured to package content files encoded by the encoder 112 in one or more output packaging formats for subsequent provisioning. Particular embodiments of transpackagers and transpackaging may be described below.

Networks 106 may be any combinations of private and/or public, wired and/or wireless, local and/or wide area networks. Private networks may include, e.g., but are not limited to, enterprise networks. Public networks, may include, e.g., but is not limited to, the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor server 104 communicate with content consumption devices 108. Similarly, at the content consumption end, networks 106 may include base stations and/or access points, through which consumption devices 108 communicate with content aggregator/distributor server 104. In between the two ends may be any number of network routers, switches and other networking equipment of the like. However, for ease of understanding, these gateways, firewalls, routers, switches, base stations, access points and the like are not shown.

In various embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126.

In various embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive signals from user input device 126 that are indicative of the user selections/inputs from a user, and to selectively render a contextual information interface as described herein.

While shown as part of a content consumption device 108, display 124 and/or user input device(s) 126 may be standalone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and user input device 126 may be a separate remote control, gaming controller, keyboard, or another similar device. Similarly, for a desktop computer arrangement, player 122, display 124 and user input device(s) 126 may all be separate stand alone units. On the other hand, for a tablet arrangement, display 124 may be a touch sensitive display screen that includes user input device(s) 126, and player 122 may be a computing platform with a soft keyboard that also includes one of the user input device(s) 126. Further, display 124 and player 122 may be integrated within a single form factor. Similarly, for a smartphone arrangement, player 122, display 124 and user input device(s) 126 may be likewise integrated.

Referring now to FIG. 2, example components and information flows for transpackaging of content are illustrated in accordance with various embodiments. For example, in FIG. 2, a transpackager 200 and bytemap file and bytemap index generator 201 ("BG 201") are illustrated, along with various files, such as encoded content files 240, bytemap file 210, and bytemap index 220. In various embodiments, the transpackager 200, BG 201, bytemap file 210, and bytemap index 220 may be implemented as part of the content provisioning 116, as described above. In various embodiments, one or more of the entities shown in FIG. 2 may be located elsewhere, such as elsewhere on the content aggregator/distributor server(s) 104.

In various embodiments, the transpackager 200 may include one or more software and/or hardware modules which may be configured to generate one or more output content 250 in accordance with one or more output content packaging formats. In various embodiments, the output content 250 may include audio and/or video content. For example, as illustrated in FIG. 2, the output content 250 has been generated in conformance with the MPEG-4 Part 14 (or "MP4") packaging format. While the example of MP4 packaging format is used in the FIG. 2 for the purpose of easier illustration, it may be recognized that embodiments discussed herein are not limited to any particular packaging format. Thus, in other embodiments, packaging formats such as AVI, Flash, OGG, and/or others may be used. In various embodiments, output content 250 may be generated, by transpackager 200, as whole files. In other embodiments, output content 250 may be generated as virtual files. In various embodiments, generation of a virtual file may include generation and provision of bytes of a file based on their locations in the virtual file with generating the full and complete output content file itself.

In various embodiments, the transpackager 200 may be configured to generate the output content 250 from one or more encoded content files 240 provided to transpackager 200. In various embodiments, the encoded content files 240 may include audio and/or video content and may be encoded and/or packaged according to various encoding and/or packaging schemes. In various embodiments, the encoded content files 240 may be generated through activities of the encoder 112 and/or stored on storage 114, as discussed above. In various embodiments, the encoded content files 240 may be individually identified so that they may be used with particularity during generation of the output content 250. In various embodiments, one or more of the encoded content files 240 may themselves be generated as output content 250. Thus, in some embodiments, the transpackager 200 may generate a first output content 250 to serve as an input encoded content file 240 when generating a second encoded content 250. In some such embodiments, the transpackager 200 may be configured to generate the first output content 250 in response to a request for second output content 250.

In various embodiments, the transpackager 200 may be configured to generate the output content 250 from the encoded content files 240 based at least in part on a bytemap file 210. In various embodiments, the bytemap file 210 may include one or more operations that, when performed by the transpackager 200 on the encoded content files 240, may facilitate the transpackager 200 in generating the output content 250. In various embodiments, the bytemap file 210 may be associated with a particular output packaging format. Thus, in the illustrated example of FIG. 2, the bytemap 210 includes instructions that facilitate the transpackager 200 in generating the output content 250 in the MP4 format. In various embodiments, the transpackager 200 may be configured to perform operations from other bytemap files 210 that may be associated with other output packaging formats. In various embodiments, the bytemap file 210 may be generated by the BG 201.

In various embodiments, the transpackager 200 may be configured to perform various operations from one or more bytemap files 210. In various embodiments, the transpackager 200 may be configured to perform one or more operations that write data to the output content 250. For example, write operations that may be performed by the transpackager 200 in various embodiments include, but are not limited to:

STATIC <count><bytes . . . >—this operation may copy next <count><bytes> from a table in the bytemap file 210 to the output content 250;

COPY <file#><count>—this operation may copy next <count> bytes from encoded content file 240 identified by <file#> to output content 250; and FILL <value><count>—this operation may copy <count> copies of <value> byte to output content 250.

In various embodiments, the transpackager 200 may be configured to perform one or more seek operations that allow the transpackager 250 to move through a particular encoded content file 240 during generation of the output content 250. For example, seek operations that may be performed by the transpackager 200 in various embodiments include, but are not limited to:

JUMP <file#><offset>—this operation may cause the transpackager to seek to <offset> in the encoded content file identified by <file#>; and SKIP <file#><count>—this operation may cause the transpackager to skip the next <count> bytes in the encoded content file identified by <file#>.

In various embodiments, the operations may be configured as a single byte opcode+parameter followed by LEB-encoded (or "little-endian-base encoded") numbers for counts and offsets. In other embodiments, other syntax may be utilized, such as to encode opcodes more compactly, though this may involve greater decoding complexity. As illustrated in the example of FIG. 2, the illustrated example of bytemap 210 shows particular example usage of the JUMP, COPY, FILL, and STATIC operations described herein. Additionally, the illustrated example shows additional bytes (at locations 0x195 and 0x200) of byte values that may be copied to output content 250 via performance of the STATIC operation at location 0x190.

In various embodiments, the transpackager 200 may generate the output content 250 for various reasons. For example, the transpackager 200 may generate the output content 250 ahead of a request for the output content 250; the generated output content 250 may then be stored for later provisioning.

In other embodiments, however, the output content 250 may be generated in response to receipt of a content request 230, such as from the content consumption device 108. In various embodiments, the content request 230 may include one or more pieces of information that may be used by the transpackager 200 to generate the output content 250. For example, the content request 230 may include a content ID 233, which may identify a particular piece of content that is being requested. In various embodiments, the encoded content files 240 may each be associated with a content ID 233 as well. Thus, in the example illustrated in FIG. 2, the content ID 233 in the content request 230 identifies that the content request 230 is a request for content of ID=1. Similarly, one of the encoded content files 240 is also associated with that content ID. Thus, the associated encoded content file 240 may be used by the transpackager 200 to generate the output content 250 in response to the illustrated content request 230 with content ID 233 equal to 1.

In various embodiments, the content request 230 may also include an output packaging format identifier 235 that may identify which output packaging format may be requested for the output content 250. In various embodiments, the transpackager 200 may use one or more bytemap files 210 that are associated with the output packaging format identified by the output packaging format identifier 235. Thus, in the illustrated example of FIG. 2, the output packaging format identifier 235 identifies that the output media format is MP4, and the transpackager uses the bytemap file 210, which is associated with the MP4 output packaging format, to generate the output content 250 to be formatted according to the MP4 format.

In various embodiments, the content request 230 may also include an offset position identifier 238. In various embodiments, this offset position identifier 238 may identify an offset position at which the piece of content is requested to begin. In various embodiments, the transpackager 200 may be configured to generate the output content 250 at a starting position that is based, at least in part, on the offset position identified in the offset position identifier 238. In various embodiments, the offset position may identify a byte offset, a time offset, or another format of offset.

In various embodiments, the transpackager 200 may be configured to access a bytemap index 220 to facilitate generation of the output content 250 at the starting position. In various embodiments, the bytemap index 220 may be a file that is associated with a particular bytemap file 210 (herein indicated as the bytemap index 220 that is associated with the bytemap associated with the MP4 format). The bytemap index 220, in various embodiments, may include associated pairs of offset values 224 and locations 226 in the associated bytemap file 210. Thus, in various embodiments, the transpackager 200 may consult the bytemap index 220 to determine, based on the offset position identifier 238, a location in the bytemap file 210 at which to begin performing operations. The transpackager 200 may utilize the bytemap index 220, in various embodiments, in order to reduce cost of extraneous operations that precede a requested offset position. In various embodiments, the bytemap index 220 may be generated by the BG 201.

In various embodiments, the bytemap index 220 may not include associations for every offset position in the piece of content or every location in the bytemap file 210. Instead, a subset of possible offset/operation pairs may be selected for inclusion in the bytemap index 210. These pairs may be selected, in various embodiments, to reduce the size of the bytemap index 220. In other embodiments, these pairs may be selected to provide positions in the bytemap file 210 at which it may be easiest for the transpackager 200 to begin generation of the output media file.

In various embodiments, because the bytemap index 220 may not provide an offset/location pair for every possible offset, in various embodiments, the transpackager 200 may be configured to select a starting position that is not identical to the offset position identifier 238 but which is identified in the bytemap index 220. Thus, in various embodiments, the transpackager 200 may be configured to select, from the bytemap index, an offset position that is latest in time before the offset position identified in the offset position identifier 238. For example, in the example of FIG. 2, the offset position identifier 238 identifies an offset position of 114. However, there is no offset of 114 listed in the bytemap index 220. An offset of 110 is listed, however, and is the latest offset included in the bytemap index that precedes the requested offset. Thus, the transpackager 200 may be configured to generate the output content 250 by performing operations at 0x175, which is the location identified by the bytemap index 220 for the offset position 110. In various embodiments, the generated output content 250 may then be provisioned starting at the generated position 110, or at the identified offset position 114. In various embodiments, the offset position may be identified using While the example of FIG. 2 illustrates the bytemap index 220 and the bytemap file 210 as separate files, in various embodiments, other implementations may be utilized. For example, one or more of the bytemap index 220 and/or the bytemap file 210 may be implemented, in whole or in part, in a database rather than as straightforward files or tables. In various alternative embodiments, multiple bytemap files 210 may be combined into fewer, larger files.

In various embodiments, these larger files may utilize a special delimiter, such as an ENID opcode, to separate sequences of operations that would be associated with a particular bytemap file 210. An operation location, such from a bytemap index 220 may then be used to locate each particular sequence of operations. In one example, such embodiments, may be used in adaptive bitrate streaming (such as HTTP Live Streaming or "HLS", MPEG-DASH, etc.). In such scenarios, operation sequences for multiple segments for a transport stream may be included in a single .bytemap, with each sequence ending with END opcode. The bytemap index may then be implemented as a playlist (such as .m3u8 in the case of HLS) that lists a Uniform Resource Locators which include the operation locations. In such embodiments, the transpackager may need access to only three physical files: a stream data file (acting as the encoded content file 240), the bytemap file 210, and the playlist file.

Figure 3:
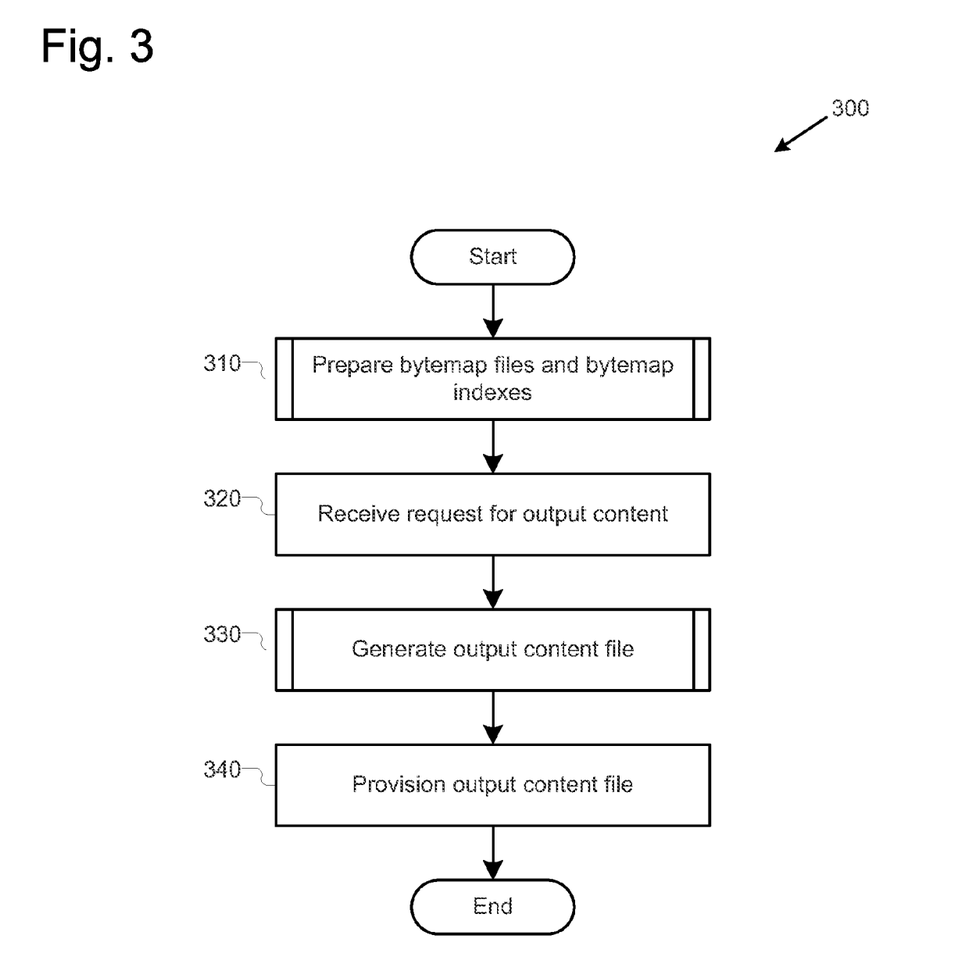
FIG. 3 illustrates an example process for transpackaging of content, in accordance with various embodiments.

Referring now to FIG. 3, an example process 300 for transpackaging of content is shown, in accordance with various embodiments. In various embodiments, process 300 may be performed by content provisioning 116 in order to prepare for and perform packaging of content. In various embodiments, the operations described in process 300 may be combined, split into additional operations, and/or omitted. The process may begin at operation 310, where the BG 201 may prepare bytemap files 210 and bytemap indexes 220 for later transpackaging. Various embodiments of operation 310 are described below with reference to process 400 of FIG. 4. Next, at operation 320, the transpackager 200 may receive a request 230 for output content in a particular output packaging format, e.g. from a content consumption device 108. In various embodiments, the request may include receipt of a content request 230, as described above. Next, at operation 330, the transpackager 200 may generate the output content 250 in the requested output packaging format. Various embodiments of operation 330 are described below with reference to process 500 of FIG. 5. Next, at operation 340, the generated output content 250 in the requested output packaging format may be provisioned, such as to content consumption device 108, by e.g. content provisioning 116. The process may then end.

Figure 4:
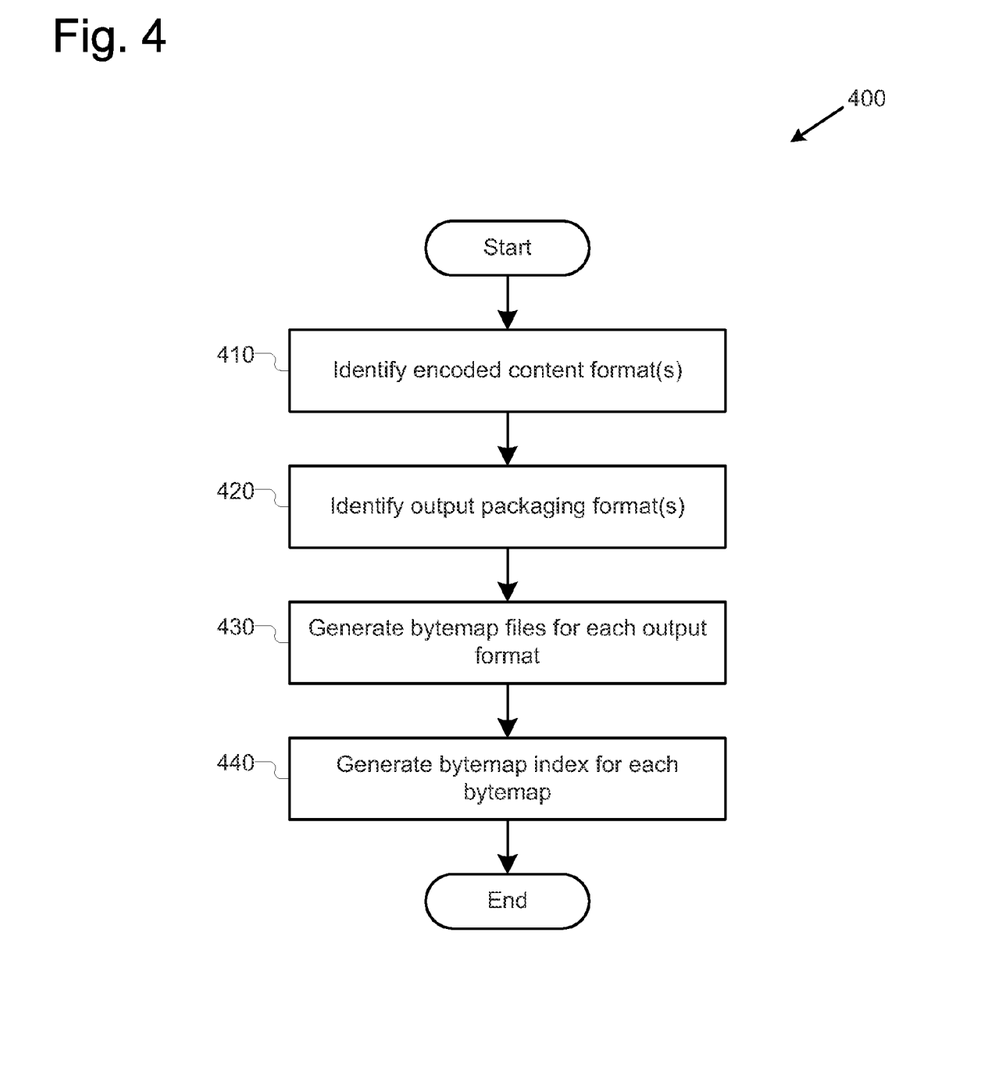
FIG. 4 illustrates an example process for preparing bytemap files and bytemap indexes for transpackaging, in accordance with various embodiments.

Referring now to FIG. 4, an example process 400 for preparing bytemap files 210 and bytemap indexes 220 for transpackaging is shown, in accordance with various embodiments. In various embodiments, process 400 may be performed by BG 201. In various embodiments, the operations described in process 400 may be combined, split into additional operations, and/or omitted. The process may begin at operation 410, where formats of the encoded content files 240 may be identified, e.g., by BG 201. In various embodiments, at operation 410, the formats of existing encoded content files 240 may be identified, e.g., by BG 201. In other embodiments, at operation 410, the capabilities of the encoder 112 may be determined to identify formats for potential encoded content files 240, e.g., by BC 201. Next at operation 420, output packaging formats may be identified, e.g., by BG 201. In various embodiments, the output packaging formats may include formats for which previous content requests have been received; in other embodiments, other formats may be identified at operation 420. Next, at operation 430, bytemap files 210 may be generated for each output format, e.g., by BG 201. In various embodiments, multiple bytemap files 210 may be generated for an output format, such as if different encoded content files 240 or different pieces of content present different transpackaging needs. Then, at operation 440, bytemap indexes 220 may be created for each bytemap file 210, e.g., by BC 201. In various embodiments, rather than creating separate files, at operations 430 and 440, multiple bytemap files 210 and/or bytemap indexes 220 may be combined into fewer files, such as described above. While FIG. 4 illustrates bytemap files 210 and bytemap indexes 220 being written in separate operations, in various embodiments, bytemap files 210 and bytemap indexes 220 may be written as part of a unified operation or process. The process may then end.

Figure 5:
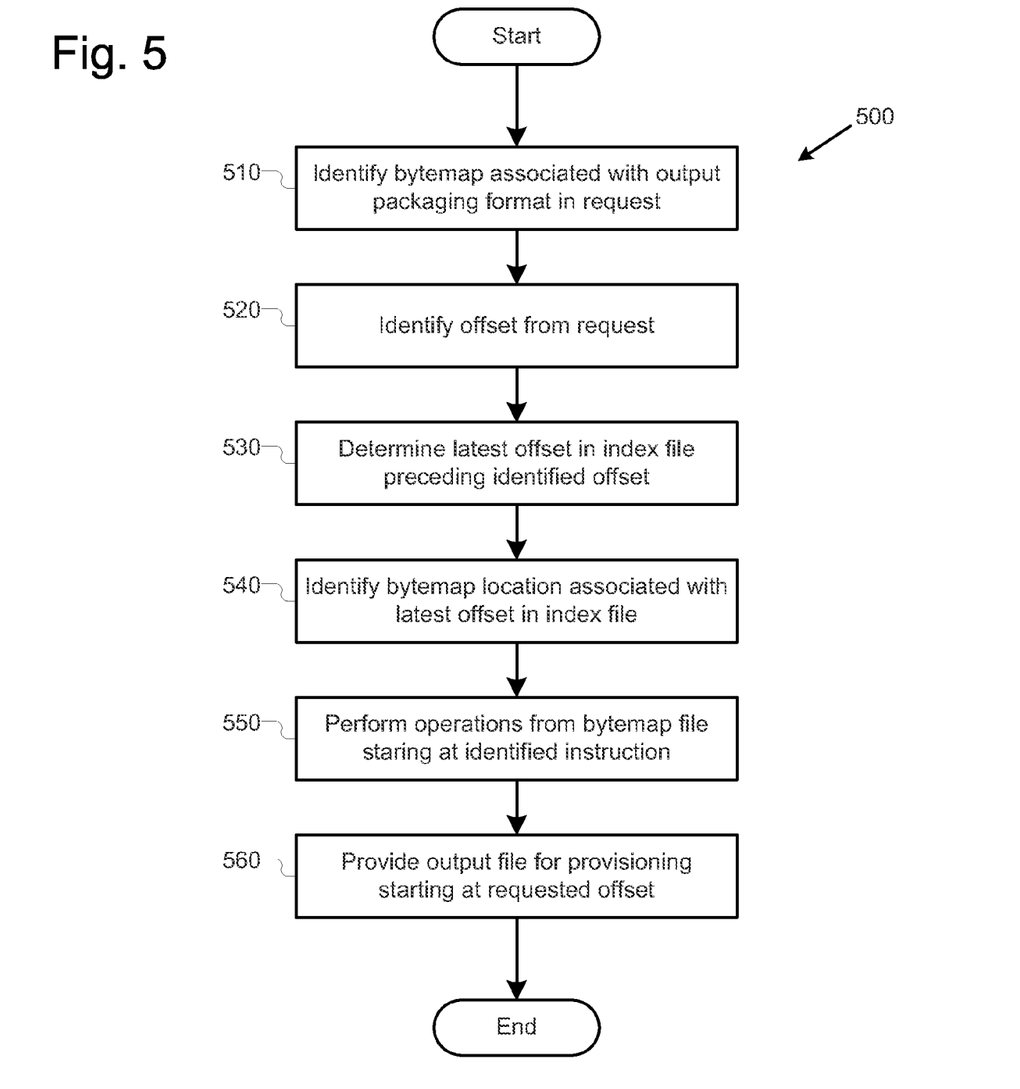
FIG. 5 illustrates an example process for generating output content according to an output packaging format, in accordance with various embodiments.

Referring now to FIG. 5 an example process 500 for the transpackager 200 to generate output content according to an output packaging format, in accordance with various embodiments. In various embodiments, the operations described in process 500 may be combined, split into additional operations, and/or omitted. The process may begin at operation 510, where the transpackager 200 may identify a bytemap file that is associated with the output packaging format identified in the output packaging format identifier 235 received in the content request 230. Next, at operation 520, the transpackager 200 may identify the offset position from the offset position identifier 238 of the content request 230. Next at operation 530, the transpackager 200 may identify the latest offset in the previously-identified bytemap index 220 that precedes the identified offset as a starting offset. Next, at operation 540, the transpackager 200 may identify the location in the previously-identified bytemap file 210 that is associated with the starting offset in the bytemap index 220. At operation 550, the transpackager 200 may perform operations from the bytemap file 210 beginning at the location identified at operation 540. In various embodiments, performance of the operations from the bytemap file 210 at operation 550 may result in generation of the output content 250. Next, at operation 560, the transpackager 200 may provide the output content 250 for provisioning beginning at the requested offset. In various embodiments, the transpackager 200 may thus provide the output content 250 beginning at a later offset than it was originally generated at. In other embodiments, the transpackager 200 may provide the output content 250 at the same offset at which the operations began to be performed at. The process may then end.

Figure 6:
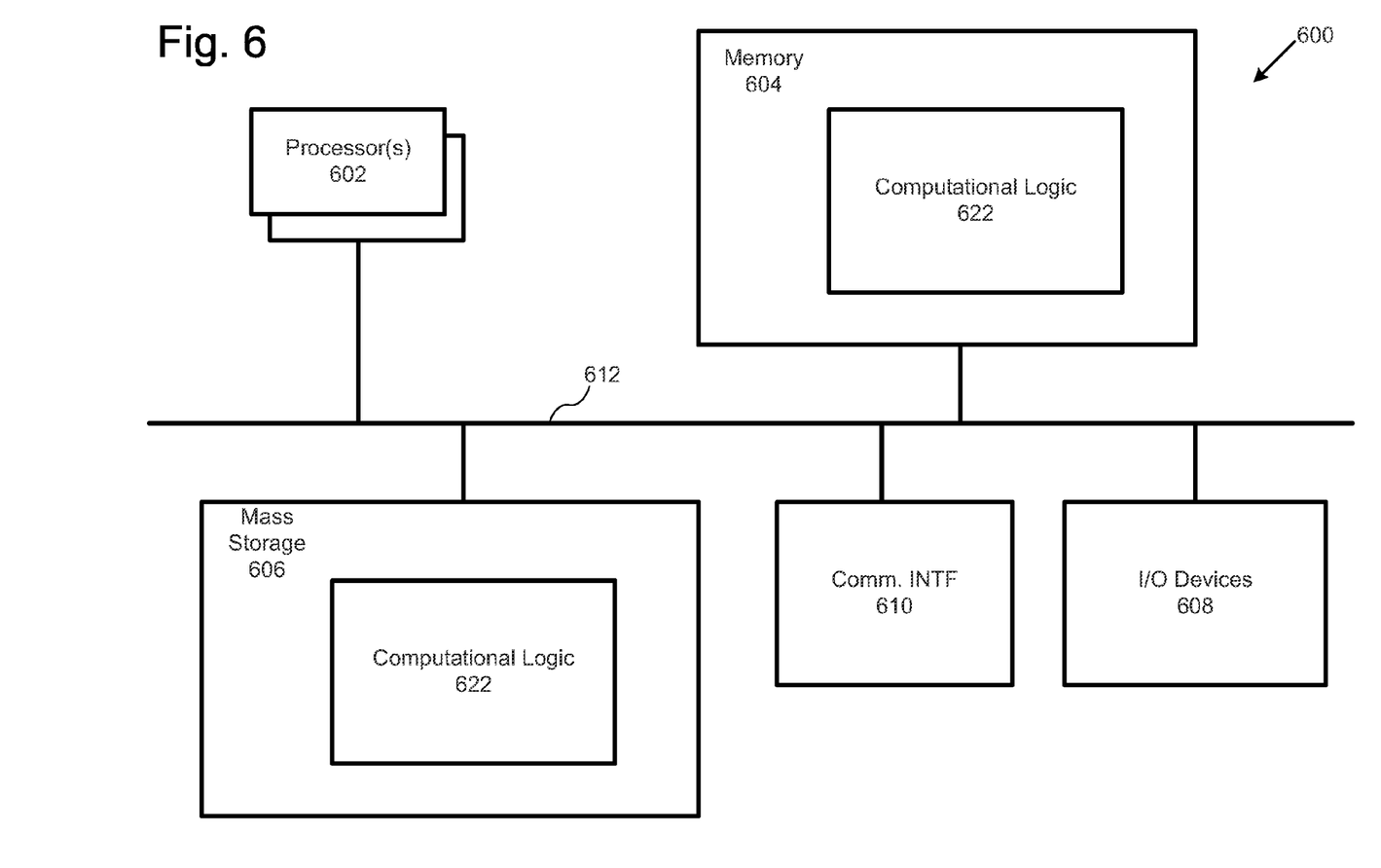
FIG. 6 illustrates an example computing environment suitable for practicing various aspects of the present disclosure, in accordance with various embodiments.

Referring now to FIG. 6, an example computer suitable for use for various components and processes of FIGS. 1-5 is illustrated in accordance with various embodiments. In embodiments, the computer 600 may be suitable for use as a stationary or mobile computing device. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control, remote control, gaming controller, image capture device, and so forth) and communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with content aggregator/distributor 104, e.g., operations shown in FIGS. 3-5. The various elements may be implemented by assembler instructions supported by processor(s) 602 or high-level languages, such as, for example, C, that can be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 610-612 may vary, depending on e.g., the number of content files, the number of file formats, etc., computer 600 is designed to support, when used as a content aggregator/distributor server 104, and whether the content aggregator/distributor server 104 is a stationary or mobile device, like a computing tablet, ultrabook or laptop. Their constitutions are otherwise known, and accordingly will not be further described.

Figure 7:
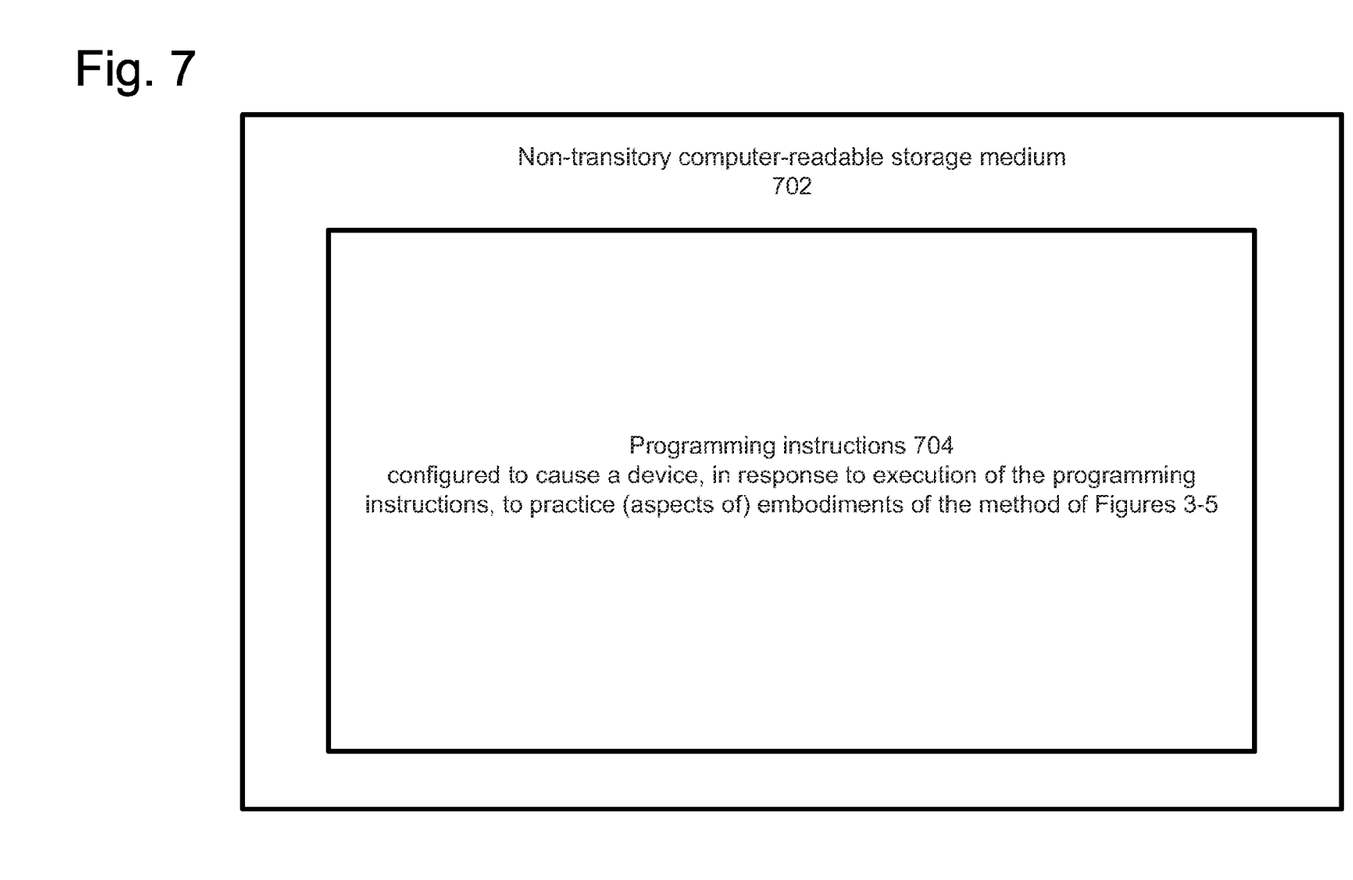
FIG. 7 illustrates an example storage medium with instructions configured to enable an apparatus to practice various aspects of the present disclosure, in accordance with various embodiments.

FIG. 7 illustrates an example least one computer-readable storage medium 702 having instructions configured to practice all or selected ones of the operations associated with content aggregator/distributor server 104, earlier described, in accordance with various embodiments. As illustrated, least one computer-readable storage medium 702 may include a number of programming instructions 704. Programming instructions 704 may be configured to enable a device, e.g., computer 600, in response to execution of the programming instructions, to perform, e.g., various operations of processes 300, 400, and 500 of FIGS. 3-5, e.g., but not limited to, to the various operations performed to perform transpackaging of encoded content to generate output content 250. In alternate embodiments, programming instructions 704 may be disposed on multiple least one computer-readable storage media 702 instead.

Referring back to FIG. 6, for one embodiment, at least one of processors 602 may be packaged together with computational logic 622 configured to practice aspects of processes 300, 400, and 500 of FIGS. 3-5. For one embodiment, at least one of processors 602 may be packaged together with computational logic 622 configured to practice aspects of processes 300, 400, and 500 of FIGS. 3-5 to form a System in Package (SiP). For one embodiment, at least one of processors 602 may be integrated on the same die with computational logic 622 configured to practice aspects of processes 300, 400, and 500 of FIGS. 3-5. For one embodiment, at least one of processors 602 may be packaged together with computational logic 622 configured to practice aspects of processes 300, 400, and 500 of FIGS. 3-5 to form a System on Chip (SoC). For at least one embodiment, the SoC may be utilized in, e.g., but not limited to, a computing tablet.

Various embodiments of the present disclosure have been described. These embodiments include, but are not limited to, those described in the following paragraphs.

Example 1 may include one or more computer-readable media containing instructions written thereon that, in response to execution on a computing device, cause the computing device to generate output content in an output packaging format. The instructions may cause the computing device to read one or more operations from a bytemap file associated with the output packaging format for a piece of content and perform the one or more operations to generate the output content in the output packaging format based at least in part on one or more encoded content files.

Example 2 may include the one or more computer-readable media of example 1, and further specify that the instructions are further configured to cause the computing device to receive a request for content, the request identifying the output packaging format.

Example 3 may include the one or more computer-readable media of example 2, and further specify that the instructions are further configured to cause the computing device to provide the generated output content in response to the received request.

Example 4 may include the one or more computer-readable media of example 3, and further specify that the request further identifies a requested offset position in the content at which the content is requested to be provided and that provide the generated output content includes provide the generated output content at a starting position based at least in part on the requested offset position.

Example 5 may include the one or more computer-readable media of example 4, and further specify that the starting position is the same as the requested offset position.

Example 6 may include the one or more computer-readable media of example 4, and further specify that the starting position precedes the requested offset position.

Example 7 may include the one or more computer-readable media of example 3, and further specify that provide the generated output media at a starting position includes identify, based at least in part on a bytemap index that associates offset positions in the content to locations of operations in the bytemap file, a starting operation associated with the starting position. Example 7 may also further specify that perform the one or more operations includes perform the one or more operations starting at the identified starting operation.

Example 8 may include the one or more computer-readable media of example 7, and further specify that the starting operation is associated with a latest offset in the index file that precedes the requested offset position.

Example 9 may include the one or more computer-readable media of any one of examples 1-8, and further specify that the one or more operations from the bytemap file include a copy operation and that perform the one or more operations includes apply the copy operation to copy one or more bytes of data from the encoded content files to the output content.

Example 10 may include the one or more computer-readable media of any one of examples 1-8, and further specify that the one or more operations from the bytemap file include a write operation and that perform the one or more operations includes write one or more bytes of data that are compliant with the output packaging format to the output content.

Example 11 may include the one or more computer-readable media of example 10, and further specify that write one or more bytes of data includes copy the one or more bytes of data from the bytemap file.

Example 12 may include the one or more computer-readable media of example 10, and further specify that write one or more bytes of data includes write a plurality of copies of a data value identified in the write operation.

Example 13 may include the one or more computer-readable media of any one of examples 1-8, and further specify that the one or more operations from the bytemap file include a seek operation and that perform the one or more operations includes perform further operations from the bytemap file based on a selected one of the encoded content files at a location identified by the seek operation.

Example 14 may include the one or more computer-readable media of any one of examples 1-8, and further specify that the instructions are further configured to generate one or more of the encoded content files by application of one or more operations of one or more bytemap files associated with the one or more generated content files.

Example 15 may include an apparatus for generation of output content in an output packaging format. The apparatus may include one or more computer processors and a transpackager configured to be operated on the one or more computer processors. The transpackager may be configured to read one or more operations from a bytemap file associated with the output packaging format for a piece of content and perform the one or more operations to generate the output content in the output packaging format based at least in part on one or more encoded content files.

Example 16 may include the apparatus of example 15, and further specify that the transpackager is further configured to receive a request for content, the request identifying the output packaging format.

Example 17 may include the apparatus of example 16, and further specify that the transpackager is further configured to provide the generated output content in response to the received request.

Example 18, may include the apparatus of example 17, and further specify that: the request further identifies a requested offset position in the content at which the content is requested to be provided and that provide the generated output content includes provide the generated output content at a starting position based at least in part on the requested offset position.

Example 19 may include the apparatus of example 18, and further specify that the starting position is the same as the requested offset position.

Example 20 may include the apparatus of example 19, and further specify that the starting position precedes the requested offset position.

Example 21 may include the apparatus of example 18, and further specify that provide the generated output media at a starting position includes identify, based at least in part on a bytemap index that associates offset positions in the content to locations of operations in the bytemap file, a starting operation associated with the starting position. Example 21 may further specify that perform the one or more operations includes perform the one or more operations starting at the identified starting operation.

Example 22 may include the apparatus of example 21, and further specify that the starting operation is associated with a latest offset in the index file that precedes the requested offset position.

Example 23 may include the apparatus of any one of examples 15-22, and further specify that the one or more operations from the bytemap file include a copy operation and that perform the one or more operations includes apply the copy operation to copy one or more bytes of data from the encoded content files to the output content.

Example 24 may include the apparatus of any one of examples 15-22, and further specify that the one or more operations from the bytemap file include a write operation and that perform the one or more operations includes write one or more bytes of data that are compliant with the output packaging format to the output content.

Example 25 may include the apparatus of example 24, and further specify that write one or more bytes of data includes copy the one or more bytes of data from the bytemap file.

Example 26 may include the apparatus of example 24, and further specify that write one or more bytes of data includes write a plurality of copies of a data value identified in the write operation.

Example 27 may include the apparatus of any one of examples 15-22, and further specify that the one or more operations from the bytemap file include a seek operation and that perform the one or more operations includes perform further operations from the bytemap file based on a selected one of the encoded content files at a location identified by the seek operation.

Example 28 may include the apparatus of any one of examples 15-22, and further specify that the one or more of the encoded content files are themselves generated by the transpackager through application of one or more operations of one or more bytemap files associated with the one or more generated content files.

Example 29 may include a computer-implemented method for generating output content in an output packaging format. The method may include reading, by a computing device, one or more operations from a bytemap file associated with the output packaging format for a piece of content and performing, by the computing device, the one or more operations to generate the output content in the output packaging format based at least in part on one or more encoded content files.

Example 30 may include the method of example 29, and further include receiving, by the computing device, a request for content, the request identifying the output packaging format.

Example 31 may include the method of example 30, and further include providing, by the computing device, the generated output content in response to the received request.

Example 32 may include the method of example 31, and further specify that the request further identifies a requested offset position in the content at which the content is requested to be provided and that providing the generated output content includes providing the generated output content at a starting position based at least in part on the requested offset position.

Example 33 may include the method of example 32, and further specify that the starting position is the same as the requested offset position.

Example 34 may include the method of example 32, and further specify that the starting position precedes the requested offset position.

Example 35 may include the method of example 31, and further specify that providing the generated output media at a starting position includes identifying, based at least in part on a bytemap index file that associates offset positions in the content to locations of operations in the bytemap file, a starting operation associated with the starting position. Example 35 may further specify that performing the one or more operations includes performing the one or more operations starting at the identified starting operation.

Example 36 may include the method of example 35, and further specify that the starting operation is associated with a latest offset in the index file that precedes the requested offset position.

Example 37 may include the method of any one of examples 29-36, and further specify that the one or more operations from the bytemap file include a copy operation and that performing the one or more operations includes applying the copy operation to copy one or more bytes of data from the encoded content files to the output content.

Example 38 may include the method of any one of examples 29-36, and further specify that the one or more operations from the bytemap file include a write operation and that performing the one or more operations includes writing one or more bytes of data that are compliant with the output packaging format to the output content.

Example 39 may include the method of example 38, and further specify that writing one or more bytes of data includes copying the one or more bytes of data from the bytemap file.

Example 40 may include the method of example 38, and further specify that writing one or more bytes of data includes writing a plurality of copies of a data value identified in the write operation.

Example 41 may include the method of any one of examples 29-36, and further specify that the one or more operations from the bytemap file include a seek operation and that performing the one or more operations includes performing further operations from the bytemap file based on a selected one of the encoded content files at a location identified by the seek operation.

Example 42 may include the method of any one of examples 29-36, and further include generating one or more of the encoded content files by performing one or more operations of one or more bytemap files associated with the one or more generated content files.

Example 43 may include an apparatus for generating output content in an output packaging format. The apparatus may include means for reading one or more operations from a bytemap file associated with the output packaging format for a piece of content and means for performing the one or more operations to generate the output content in the output packaging format based at least in part on one or more encoded content files.

Example 44 may include the apparatus of example 43, and further include means for receiving a request for content, the request identifying the output packaging format.

Example 45 may include the apparatus of example 44, and further include means for providing the generated output content in response to the received request.

Example 46 may include the apparatus of example 45, and further specify that the request further identifies a requested offset position in the content at which the content is requested to be provided and that means for providing the generated output content includes means for providing the generated output content at a starting position based at least in part on the requested offset position.

Example 47 may include the apparatus of example 46, and further specify that the starting position is the same as the requested offset position.

Example 48 may include the apparatus of example 46, and further specify that the starting position precedes the requested offset position.

Example 49 may include the apparatus of example 45, and further specify that means for providing the generated output media at a starting position includes means for identifying, based at least in part on a bytemap index that associates offset positions in the content to locations of operations in the bytemap file, a starting operation associated with the starting position. Example 49 may further specify that means for performing the one or more operations includes means for performing the one or more operations starting at the identified starting operation.

Example 50 may include the apparatus of example 49, and further specify that the starting operation is associated with a latest offset in the index file that precedes the requested offset position.

Example 51 may include the apparatus of any one of examples 43-50, and further specify that the one or more operations from the bytemap file include a copy operation and that means for performing the one or more operations includes means for applying the copy operation to copy one or more bytes of data from the encoded content files to the output content.

Example 52 may include the apparatus of any one of examples 43-50, and further specify that the one or more operations from the bytemap file include a write operation and that means for performing the one or more operations includes means for writing one or more bytes of data that are compliant with the output packaging format to the output content.

Example 53 may include the apparatus of example 52, and further specify that means for writing one or more bytes of data includes means for copying the one or more bytes of data from the bytemap file.

Example 54 may include the apparatus of example 52, and further include means for writing one or more bytes of data includes means for writing a plurality of copies of a data value identified in the write operation.

Example 55 may include the apparatus of any one of examples 43-50, and further specify that the one or more operations from the bytemap file include a seek operation and that means for performing the one or more operations includes means for performing further operations from the bytemap file based on a selected one of the encoded content files at a location identified by the seek operation.

Example 54 may include the apparatus of any one of examples 43-50, and further include means for generating one or more of the encoded content files by performing one or more operations of one or more bytemap files associated with the one or more generated content files.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus comprising:
    a memory configured to store a plurality of pairs of instruction files and instruction indexes for content, wherein the plurality of pairs of instruction files and instruction indexes are associated with a plurality of content formats, and
    wherein, for each one of the pairs, of an instruction file and an instruction index:
        the instruction file lists a set of distinct operations associated with the content;
        the instruction index includes a set of time offsets and corresponding instruction locations;
        each of the time offsets indicates a location, in the content, that corresponds to one of possible selectable starting points in the content; and
        each of the instruction locations is a location, in the instruction file, at which one of the distinct operations is listed; and
    one or more computer processors configured to:
        receive a first request for a portion of output content, wherein the portion begins at a starting point, wherein the first request includes data identifying a first one of the plurality of content formats,
        identify a first instruction file and a first instruction index from the plurality of pairs of the instruction files and the instruction indexes based on the first content format,
        based on the starting point, identify a corresponding time offset among time offsets provided in the first instruction index,
        determine, based on the identified time offset and the first instruction index, a location of a listed operation in the first instruction file,
        perform the listed operation and one or more other operations listed in the first instruction file to generate, in the first content format, a first output file based on a content file associated with the content, wherein the first output file includes the portion of the output content.

2. The apparatus of claim 1, wherein the one or more computer processors are further configured to:
    acquire content data, and
    perform at least one operation identified in a second instruction file to convert the content data into the content file.

3. The apparatus of claim 1, wherein the first instruction index further includes data identifying portions, of the first instruction file, that correspond to sections of the output content.

4. The apparatus of claim 1, wherein the set of distinct operations includes:
    a static command to include first data from the first instruction file in the output content,
    a copy command to include second data from the content file in the output content, and
    a fill command to include third data in the output content.

5. The apparatus of claim 1, wherein the set of distinct operations includes:
    a jump command to access a portion of the content file, and
    a skip command to skip a quantity of data included in the content file.

6. The apparatus of claim 1, wherein the first request includes data identifying a particular one of a plurality of content titles, and
    wherein the one or more computer processors are further configured to:
        parse the first request to determine the particular content title, and
        identify the first instruction file and the first instruction index from the pairs of instruction files and instruction indexes further based on the particular content title.

7. The apparatus of claim 1, wherein the one or more computer processors are further configured to:
parse the first request to determine the first content format.

8. The apparatus of claim 1, wherein the one or more computer processors, when identifying the corresponding time offset, are further configured to:
identify, as the time offset, a latest one of the time offsets, identified in the first instruction index, that precedes the starting point.

9. The apparatus of claim 1, wherein at least one of the operations is listed in a format that includes encoded little-endian-base (LIB) encoded numbers.

10. A method comprising:
accessing, by a computing device, a plurality of pairs of instruction files and instruction indexes, wherein the plurality of pairs of instruction files and instruction indexes are associated with a plurality of content formats,
wherein, for each one of the pairs, of an instruction file and an instruction index:
the instruction file lists a set of distinct operations associated with content;
the instruction index includes a set of time offsets and corresponding instruction locations;
each of the time offsets indicates a location, in the content, that corresponds to one of possible selectable starting points in the content; and
each of the instruction locations is a location, in the instruction file, at which one of the distinct operations is listed;
receiving, by the computing device, a first request for a portion of output content, wherein the portion begins at a starting point, wherein the first request includes data identifying a first one of the plurality of content formats;
identifying, by the computing device, a first instruction file and a first instruction index from the plurality of pairs of the instruction files and the instruction indexes based on the first content format;
based on the starting point and by the computing device, identifying a time offset among time offsets provided in the first instruction index;
determining, by the computing device and based on the identified time offset and the first instruction index, a location of a listed operation in the first instruction file;
performing, by the computing device, the listed operation and one or more other operations listed in the first instruction file to generate, in the first content format, a first output file based on a content file associated with the content.

11. The method of claim 10, comprising:
acquiring content data; and
performing at least one operation identified in a second instruction file to convert the content data into the content file.

12. The method of claim 10, wherein the first instruction index further includes data identifying portions of the first instruction file, that correspond to sections of the output content.

13. The method of claim 10, wherein the set of distinct operations includes:
a static command to include first data from the first instruction file, in the output content,
a copy command to include second data from the content file in the output content, and
a fill command to include third data in the output content.

14. The method of claim 10, wherein the set of distinct operations includes:
a jump command to access a portion of the content file, and
a skip command to skip a quantity of data-included in the content file.

15. The method of claim 10, wherein the first request includes data identifying a particular one of a plurality of content titles, and
wherein the method further comprises:
parsing the first request to determine the particular content title; and
identifying the first instruction file and the first instruction index from the pairs of instruction files and instruction indexes further based on the particular content title.

16. The method of claim 10, further comprising:
parsing the first request to determine the first content format.

17. The method of claim 10, wherein identifying the corresponding time offset includes:
identifying, as first time offset, a latest one of the time offsets, identified in the first instruction index, that precedes the starting point.

18. The method of claim 10, wherein at least one of the distinct operations is listed in a format that includes encoded little-endian-base (LIB) encoded numbers.

19. A non-transitory computer readable medium configured to store instructions, the instructions comprising:
one or more instructions that, when executed by a processor, cause the processor to:
access a plurality of pairs of code files and code indexes, wherein the plurality of pairs of code files and code indexes are associated with a plurality of content formats;
wherein, for each one of the pairs of a code file and a code index:
the code file lists a set of distinct operations associated with content;
the code index includes a set of time offsets and corresponding code locations;
each of the time offsets indicates a location, in the content, that corresponds to one of possible selectable starting points in the content; and
each of the code locations is a location, in the code file, at which one of the distinct operations is listed;
receive a first request for a portion of output content, wherein the portion begins at a starting point, wherein the first request includes data identifying a first one of the plurality of content formats;
identify a first code file and a first code index from the plurality of pairs of the code files and the code indexes based on the first content format,
based on the starting point, identify a time offset among time offsets provided in the first instruction index;
determine, based on the identified time offset and the first code index, a location of a listed operation in the first code file;
perform the listed operation and one or more other operations listed in the first code file to generate, in the first content format, a first output file based on a content file associated with the content,
wherein the first output file includes the portion of the output content.

20. The non-transitory computer readable medium of claim 19, wherein the one or more instructions further cause the processor to:
- acquire content data; and
- performing at least one operation identified in a second code file to convert the content data into the content file.

21. The non-transitory computer readable medium of claim 19, wherein at least one of the distinct operations is listed in a format that includes encoded little-endian-base (LIB) encoded numbers.

22. The non-transitory computer readable medium of claim 19, wherein the set of distinct operations includes:
- a static command to include first data from the first code file in the output content,
- a copy command to include second data from the content file in the output content, and
- a fill command to include third data in the output content.

23. The non-transitory computer readable medium of claim 19, wherein the set of distinct operations includes:
- a jump command to access a portion of the content file, and
- a skip command to skip a quantity of data included in the content file.

24. The non-transitory computer readable medium of claim 19, wherein the first request includes data identifying a particular one of a plurality of content titles, and
wherein the one or more instructions further cause the processor to:
- parse the first request to determine the particular content title; and
- identify the first code file and the first code index from the pairs of code files and code indexes further based on the particular content title.

25. The non-transitory computer readable medium of claim 19,
wherein the one or more instructions further cause the processor to:
- parse the first request to determine the first content format.

26. The non-transitory computer readable medium of claim 19, wherein one or more instructions, when causing the processor to identify the time offset further cause the processor to:
- identify, as the time offset, a latest one of the time offsets identified in the first code index that precedes the starting point.

* * * * *